Sept. 13, 1966  P. M. McKENNA  3,271,911
ABRASIVE WHEEL
Filed April 20, 1964  2 Sheets-Sheet 1

INVENTOR.
PHILIP M. McKENNA
BY Toulmin & Toulmin
ATTORNEYS

INVENTOR.
PHILIP M. McKENNA
BY Toulmin & Toulmin

ATTORNEYS 3,271,911
ABRASIVE WHEEL
Philip M. McKenna, Greensburg, Pa., assignor to Kennametal Inc., Latrobe, Pa., a corporation of Pennsylvania
Filed Apr. 20, 1964, Ser. No. 361,066
18 Claims. (Cl. 51—206)

This invention relates to grinding wheels and cutting discs, and in particular to tools of this nature employing a wheel body to which is applied diamond grit in a matrix of bonding material.

Abrasive wheels and saws are known which employ diamond grit, but heretofore these members have generally been made with an aluminum or plastic body with the diamond grit in the matrix of bonding material applied to an annular region of the wheel or saw body, usually in the region of the periphery thereof and either facing radially or axially of the wheel body.

The selection of aluminum or plastic for the wheel bodies heretofore has been dictated by the fact that these materials can be made to have substantially the same coefficient of expansion as the bonding material, whereby the matrix is prevented from cracking as the wheel heats and cools. Furthermore, it has been common practice in the past to discard the wheel bodies when the diamond grit surfacing has been exhausted so that a matter of economy is also involved in the selection of the material for the wheel bodies.

Such diamond grit wheels and saws perform adequately in many circumstances and have generally been thought to be satisfactory. The rate of cutting of wheels of this nature is usually relatively low and, in addition, the use of the wheels is substantially restricted to extremely hard and brittle materials such as cemented tungsten carbide tool bits and the like, so that high cutting speeds and high feed rates have rarely been contemplated with tools of this nature.

I have discovered however by extensive test and experimentation that wheel bodies for diamond grit wheels and saws could be substantially improved by greatly increasing the stiffness of the bodies which eliminates deflection of the tool when placed under load, thereby eliminating vibration of the tool and its supporting spindle and enabling higher feed rates to be obtained, permitting more uniform wear of the abrasive face of the wheel, and producing finer finishes, even with a coarser grade of diamond grit.

In contemplating manners in which to increase the stiffness of the wheel body, I conceived the use of cemented tungsten carbide as a suitable material. This material has a Young's modulus of elasticity of about forty million to about ninety million and has about three times the stiffness of steel. This material, however, is possessed of another characteristics that proved to impart surprisingly advantageous characteristics to the tools made up and tested. This last-mentioned characteristic is the extreme weight of the material which varies from a density of about seventeen to about thirteen considered in the same order as the values of the modulus of elasticity set forth above. In testing the wheels made of bodies of cemented carbide, it was found that extreme stability of the wheel was obtained so that vibration of the wheel and its supporting spindle were greatly reduced and the life and efficiency of the wheels were greatly increased far beyond what was expected merely from the increase in stiffness of the tool body.

It seems that the combination of the high degree of stiffness and the high weight of the tool body which is concentrated near the abrasive surface cooperate to hold the tool body steady as it rotates so that the abrasive surface is uniformly presented along its entire length to the work to be done. This leads to longer life of the wheel and greatly improved performance in the form of finer finishes on the workpiece than has heretofore been possible, together with much more accurate end results.

The results obtained are not merely the result of increased stiffness which might be imparted to a tool body without at the same time presenting any additional mass to stabilize the body during rotation, nor is it merely the result of the increase in mass because this could be accomplished merely by making the tool body of a large piece of steel; but it involves both the increased stiffness and the increased density which makes it possible to present a stiff heavy tool body to the work region while supporting the spindle on which the tool body is mounted closely adjacent the work area. Because of the closeness of the support, the spindle bearings, for example, to the tool body, there is a minimum moment arm between the work area and the spindle bearing which minimizes the possibility of deflection of the tool body, and this of course tends to eliminate fluttering of the wheel and other vibratory movements thereof.

It has been found, in fact, that a relatively light grinding machine, when equipped with a wheel having a body constructed according to the present invention, will run with less vibration and produce finer finishes and more accurate results than could be anticipated merely from the increased stiffness of the wheel body.

Problems in connection with the manufacture of the wheel body present themselves because the usual material for the matrix expands at a different rate than the tungsten carbide of the wheel body and, furthermore, the extreme hardness of the tungsten carbide body makes a surface that does not easily establish a good bond with the bonding material. Extensive test and experimentation was therefore necessary to develop refined matrix materials and to provide for a good bond of the material to the tool body and to develop other manners of securing the diamond grit material to the wheel bodies.

In connection with wheels and saws according to the prior art, which were discarded when the grit was exhausted, the grit was bonded directly to the wheel body by the material of the matrix. With wheel bodies according to the present invention however, it is intended for the bodies to be used for indefinite periods by applying new coatings of diamond grit when the previous coating has become exhausted. The greatly improved results obtained by the use of the wheel bodies according to the present invention makes it an economy to ship the wheels when exhausted to a plant where new grit can be applied and the wheels then returned. From this fact alone it will be evident that the present invention represents a substantial advance in this particular art.

The coating of the wheel bodies with abrasive has, in turn, led to the development of a process of precasting rings consisting of matrix material with diamond grit imbedded therein, and which rings are thereafter mounted on wheel bodies to form a completed tool. The mounting of preformed rings can be accomplished by a suitable adhesive such as an epoxy resin which will firmly bond the rings to the wheel body and, in the case of abrasive rings mounted to the outer periphery of a body, and adhesive of slightly resilient nature can be employed, or the ring can be cast or molded so as to have a relatively thin slightly resilient inner plastic layer thereon which fits over the periphery of the wheel body and which is cemented thereto and which thin plastic ring provides a small annular zone of resilience to compensate for the differential expansion between the ring and the wheel body.

The foregoing comments pertain particularly to abrasive wheels having an abrasive surface on the outer periphery or on the face thereof as in connection with a cup wheel, said wheels having bodies of substantial dimension.

The same comments are, however, generally applicable to saws which have an extremely thin flat body with diamond grit around the outer periphery and on both side faces adjacent the outer periphery. Saws of this nature having cemented tungsten carbide bodies have proved to cut faster and more accurately than saws of the prior art having aluminum or plastic or even steel bodies. It seems that the stiffness of the body and the high density thereof cause the abrasive region of the periphery to run true and to be free of deflection under normal lateral loads so that thinner cuts can be taken more rapidly and more accurate end results are had.

In all cases, including both the peripheral type and the face type wheels and the saws, there appears to be a sort of mass action because of the stiffness and high density of the wheels such that a tendency for the wheel to deflect at any one point by the application of a load thereto is resisted by the entire mass of the tool body somewhat in the same manner that a gyroscope resists movement in the plane of its axis.

This particular effect is, of course, not found to be anywhere near the same degree in other type wheel bodies because they will tend to bend and flutter and vibrate due to their inherently lesser stiffness and the lesser density thereof cannot provide the same magnitude of restoring force that apparently is developed in the high density tungsten carbide bodies according to the present invention.

The stabilizing influences discussed above, together with the closeness with which the spindle support bearing can be placed to the rotating tool body seem to be the principal factors contributing to the outstanding results obtainable by the use of cemented tungsten carbide bodies for diamond grit wheels and diamond grit saws. Other factors may be present, but these are not completely known at this time.

With the foregoing in mind, it will be evident that a primary object of the present invention is the provision of a diamond grit wheel and a method of making of the same which has greatly improved operating characteristics.

Another object of this invention is the provision of a rotary diamond grit abrasive tool which will produce finer finishes and more accurate results than conventional rotary diamond grit tools.

A still further object of this invention is the provision of a rotary diamond grit abrading or cutting tool and a method of making the same having such superior results that it is economical to use the body of the tool indefinitely by applying further coatings of diamond grit abrasive thereto.

These and other objects and advantages of the invention will become more apparent upon reference to the following specification taken in connection with the accompanying drawings, in which.

Figure 1:
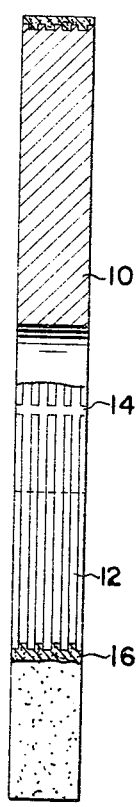
FIGURE 1 is an edge view partly in cross section of a diamond grit wheel according to the present invention having the grit on the periphery thereof.

Referring to the drawings somewhat more in detail, FIGURE 1 shows a wheel body 10 of cemented tungsten carbide which, as mentioned previously, has an extremely high density and an extremely high Young's modulus of elasticity. This wheel is preferably provided with peripheral grooves 12 intercepted at intervals by transverse grooves 14. The peripheral surface may be somewhat roughened as by sand blasting, and has bonded thereto a layer 16 consisting of diamond grit imbedded in a matrix of bonding material which is preferably adherent to both the wheel body and the diamond grit. In making up the wheel, the body is formed by conventional methods consisting of compacting the powdered material and sintering the same to form the wheel body. The wheel body is then carefully dynamically balanced so that it will run without vibration.

The extreme density of the wheel is such that the layer of diamond grit will not unbalance the wheel when applied thereto so that no further balancing after the first dynamic balancing is required. The grooves provided in the periphery of the wheel assist in bonding the matrix of bonding material to the wheel and by selecting a bonding material, preferably a resinous material which has a co-efficient of expansion compatible with that of the wheel, the diamond grit wheel is prevented from cracking and breaking off from the wheel.

Figure 2:
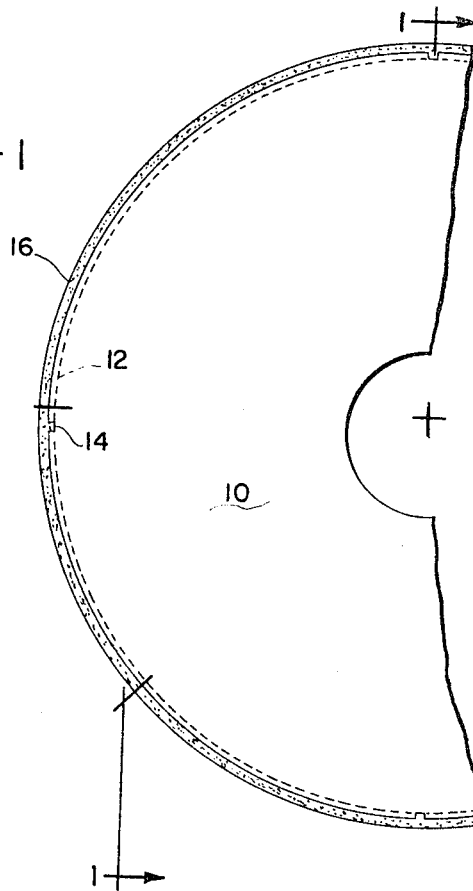
FIGURE 2 is a partial side view of the wheel of FIGURE 1.
Figure 3:
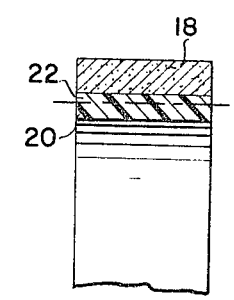
FIGURE 3 is a fragmentary view showing how a ring of bonding material with diamond grit embedded therein could be formed for mounting on the wheel body.

The wheel body is intended to be used for an indefinite period instead of being discarded as in the case of previous diamond wheel bodies, and with this in mind, it is also proposed to cast the diamond grit ring prior to placing it on the wheel. A ring of this nature is illustrated at 18 in FIGURE 3 and may advantageously be cast on an inner ring 20 of some material, such as Bakelite or Micarta, which has a small amount of inherent resilience. This inner ring 20 is then cut out to leave a thin layer 22 having an inner diameter about equal to the external diameter of a wheel body such as illustrated in FIGURES 1 and 2 but without the peripheral grooves. The diamond grit ring 18 and the thin inner layer is then cemented to the wheel body as by an epoxy resin or the like, and it has been found that this forms a good wheel with the thin inner ring 22 providing sufficient resilience to make the expansion characteristics of the bonding material less critical than when this material is applied directly to the wheel periphery as in the FIGURES 1 and 2 modification.

Figures 4, 5:
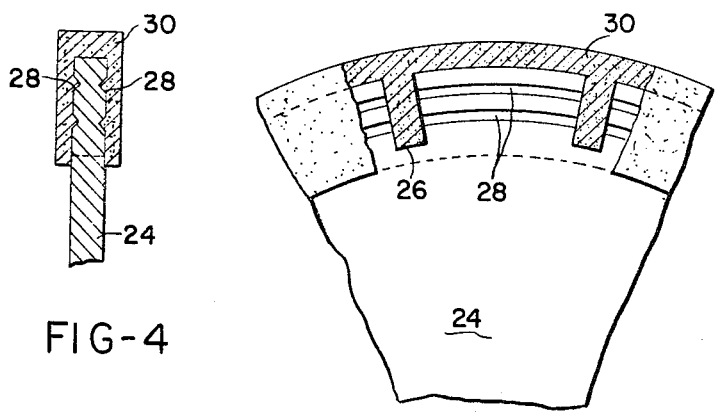
FIGURE 4 is a fragmentary sectional view through the edge of a diamond grit saw or cutting blade.
FIGURE 5 is a fragmentary side view of the saw or cutting blade of FIGURE 4 with the grit coating partly broken away to show the construction of the body of the saw.

In FIGURES 4 and 5 there is shown a diamond grit saw which has a thin flat body 24 which may be of about the same diameter as the wheel of FIGURES 1 and 2, namely, up to about 10 inches or so in diameter, although the size is not critical. Wheel body 24 is provided with circumferentially spaced radial slots 26 and circumferential grooves 28 on the opposite side, and bonded to the peripheral portion of the wheel is the diamond grit ring 30 consisting of diamond grit in a matrix of bonding material. The ring in FIGURES 4 and 5 covers the periphery of the wheel and the side faces of the wheel adjacent the periphery so that the wheel is useful for sawing or cutting operations.

Figure 6:
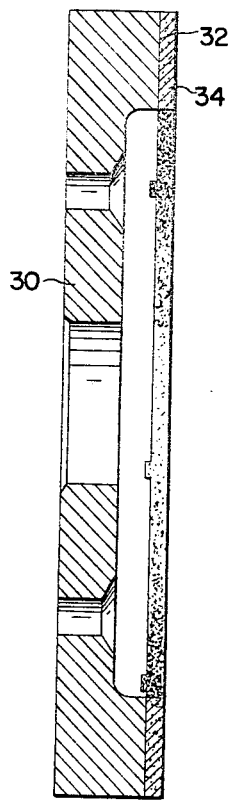
FIGURE 6 is a vertical sectional view through a face or cup type diamond grit wheel.
Figure 7:
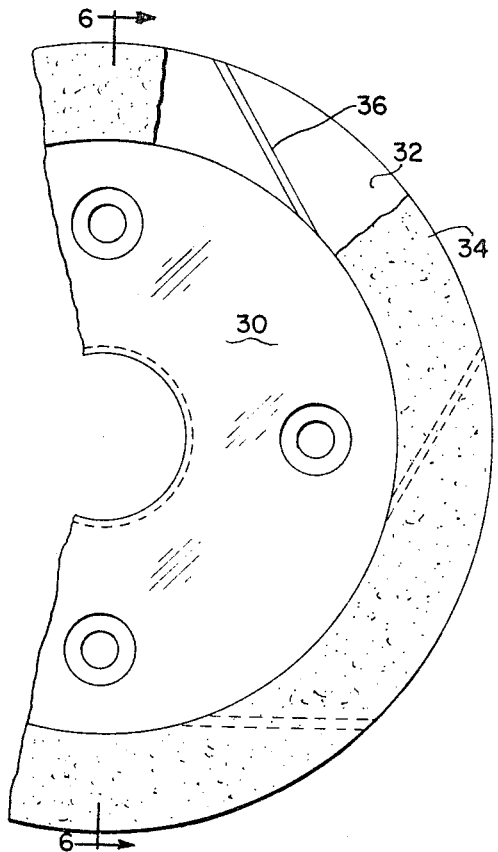
FIGURE 7 is a fragmentary front view of the wheel of FIGURE 6 with the coating or grit partly broken away to show the construction of the wheel.

FIGURES 6 and 7 show a face or cup type wheel having a body 30 provided with an annular face 32 to which is bonded a ring 34 consisting of diamond grit in a matrix of bonding material. As will be seen in FIGURE 7, the face 32 is advantageously provided with diagonal slot means 36 which assist in holding the ring of diamond grit material to the face of the wheel body.

Figure 8:
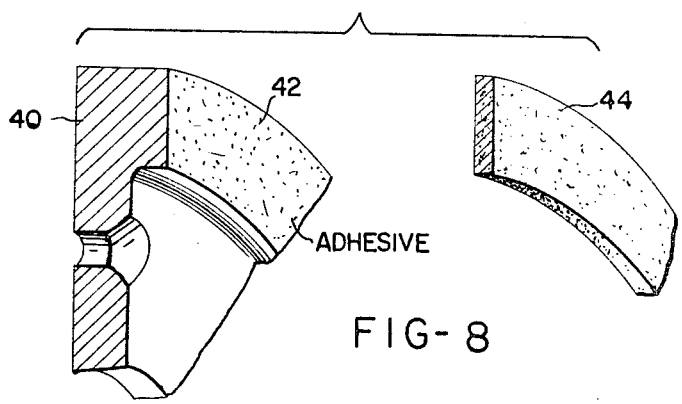
FIGURE 8 is a fragmentary perspective view of a face or cup type wheel showing how a precast ring of the matrix material with the diamond grid imbedded therein could be cemented on the wheel body.

The cup wheel of FIGURES 6 and 7 lends itself particularly well to the use of precast rings of diamond grit which are bonded to the wheel by a suitable adhesive such as an epoxy resin. This is shown in FIGURE 8 wherein wheel body 40 has an annular face 42 to which an adhesive is applied and to which face the precast ring 44, consisting of diamond grit imbedded in a matrix of bonding material is applied.

All of the wheel bodies, as mentioned before, are characterised in extreme density and stiffness and run free of vibration and produce superior finishes in less time with the same grade of diamond grit wheel employed by wheels according to the prior art.

It will be understood that this invention is susceptible to modification in order to adapt it to different usages and conditions; and accordingly, it is desired to comprehend such modifications within this invention as may fall within the scope of the appended claims.

I claim:

1. A grinding wheel comprising; a metal body having an axis of rotation and a surface on the body concentric with said axis, abrasive means secured to said surface, said body consisting of single integral mass of metal having a Young's modulus of elasticity on the order of at least 40 million pounds per square inch, and said abrasive means secured to said surface comprising abrasive particles in a bonding matrix.

2. A grinding wheel comprising; a metal body having an axis of rotation and a surface on the body concentric with said axis, abrasive means secured to said surface, said body consisting of a single integral mass of metal having a Young's modulus of elasticity on the order of at least 40 million pounds per square inch, and a density of at least 13 grams per cubic centimeter, and said abrasive means secured to said surface comprising abrasive particles in a bonding matrix.

3. A grinding wheel comprising; a metal body having an axis of rotation and a surface on the body concentric with said axis, abrasive means secured to said surface, said body consisting of a single integral mass of metal having a Young's modulus of elasticity on the order of at least 40 million pounds per square inch, and a density of at least 13 grams per cubic centimeter, and said abrasive means secured to said surface comprising abrasive particles in a bonding matrix.

4. A grinding wheel comprising; a metal body having an axis of rotation and a surface on the body concentric with said axis, abrasive means secured to said surface, said body consisting of a single integral mass of metal having a Young's modulus of elasticity on the order of at least 40 million pounds per square inch, and a density of at least 13 grams per cubic centimeter, and said abrasive means secured to said surface comprising abrasive particles in a bonding matrix, said abrasive particles consisting of diamond grit.

5. A grinding wheel comprising; a metal body having an axis of rotation and a surface on the body concentric with said axis, abrasive means secured to said surface, said body consisting of a single integral mass of metal having a Young's modulus of elasticity on the order of at least 40 million pounds per square inch, and a density of at least 13 grams per cubic centimeter, and said abrasive means secured to said surface comprising abrasive particles in a bonding matrix, said abrasive particles consisting of diamond grit, said metal comprising cemented tungsten carbide.

6. A grinding wheel comprising; a metal body having an axis of rotation and a surface on the body concentric with said axis, abrasive means secured to said surface, said body consisting of a single integral mass of metal having a Young's modulus of elasticity on the order of at least 40 million pounds per square inch, and a density of at least 13 grams per cubic centimeter, and said abrasive means secured to said surface comprising abrasive particles in a bonding matrix, said abrasive particles consisting of diamond grit, and the surface of said body to which said abrasive means is secured being interrupted by groove means extending thereacross at an angle to the circumferential direction of said surface, and said abrasive means extending into said groove means to lock the said abrasive means to said body.

7. A grinding wheel comprising; a metal body having an axis of rotation and a surface on the body concentric with said axis, abrasive means secured to said surface, said body consisting of a single integral mass of metal having a Young's modulus of elasticity on the order of at least 40 million pounds per square inch, and a density of at least 13 grams per cubic centimeter, said abrasive means secured to said surface consisting of abrasive particles in a bonding matrix, said abrasive particles consisting of diamond grit, said surface being interrupted by first groove means extending thereacross at an angle to the circumferential direction of said surface, and said surface comprising the peripheral outer surface of said body and having endless second groove means formed therein extending circumferentially of said surface and concentric to said axis of rotation, said abrasive means extending into said first and second groove means to lock said abrasive means to said body.

8. A grinding wheel comprising; a disc-like metal body adapted for rotation on the central axis thereof and an annular surface on said body concentric with said axis for receiving abrasive material, said body consisting of a single integral mass of metal having a Young's modulus of elasticity on the order of from 40 million to 90 million pounds per square inch and having a density on the order of 13 to 17 grams per cubic centimeter, and a ring of abrasive material mounted on said surface, said ring comprising diamond grit imbedded in a matrix of bonding material, said ring being adhesively secured to said surface.

9. A grinding wheel comprising; a disc-like metal body adapted for rotation on the central axis thereof and an annular surface on said body concentric with said axis for receiving abrasive material, said body consisting of a single integral mass of metal having a Young's modulus of elasticity on the order of from 40 million to 90 million pounds per square inch and having a density on the order of 13 to 17 grams per cubic centimeter, and a ring of abrasive material mounted on said surface, said ring comprising diamond grit imbedded in a matrix of bonding material, said annular surface being the outer peripheral surface of said body and said ring including an inner relatively thin annular layer of slightly resilient material and the inner surface of which engages the said annular surface of said body, and means adhesively connecting said inner surface of said resilient material to said annular surface of said body.

10. A diamond grit cutting wheel comprising; a thin metal disc adapted for rotation on the central axis of the disc, said disc consisting of a single integral mass of metal having a Young's modulus of elasticity on the order of from 40 million to 90 million pounds per square inch and having a density of from 13 to 17 grams per cubic centimeter, and diamond grit imbedded in a matrix of bonding material on the periphery of said disc, said disc having circumferentially spaced slots in the periphery thereof into which said diamond grit and bonding material extend to bind the grit and bonding material to the disc.

11. A diamond grit cutting wheel comprising; a thin metal disc adapted for rotation on the central axis of the disc, said disc consisting of a single integral mass of metal having a Young's modulus of elasticity on the order of from 40 million to 90 million pounds per square inch and having a density of from 13 to 17 grams per cubic centimeter, and diamond grit imbedded in a matrix of bonding material on the periphery of said disc, said disc having circumferentially spaced slots in the periphery thereof into which said diamond grit and bonding material extend to bind the grit and bonding material to the disc, said disc also comprising circumferential grooves in the side faces thereof adjacent the outer periphery, and said diamond grit and bonding material also extending inwardly from the outer periphery of the disc along the side faces of the disc and projecting into said grooves.

12. The method of making a grinding wheel characterized in minimal vibration and deflection in use while exhibiting maximal rate of stock removal and yielding a superior finish which comprises; forming the body of the grinding wheel of a single mass of metal having a Young's modulus of elasticity on the order of from 40 million to 90 million pounds per square inch and having a density of from 13 to 17 grams per cubic centimeter, forming an annular surface on the body concentric with the axis of rotation of the body, and fixedly mounting abrasive ring means on said annular surface and which ring means is relatively small as to mass with respect to the mass of the said body.

13. The method according to claim 12 which includes the step of dynamically balancing the wheel body prior to the mounting of said abrasive ring means on said surface.

14. The method according to claim 13 in which the said abrasive ring means is in the form of diamond grit in a matrix of bonding material.

15. The method according to claim 14 which includes the step of forming groove means in the surface to which the abrasive ring means is applied and causing the bonding material and diamond grit therein to extend into the thus formed groove means.

16. The method of making a grinding wheel which comprises; forming a disc-like grinding wheel body of a single mass of cemented tungsten carbide having a Young's modulus of elasticity of on the order of from 40 million to 90 million pounds per square inch and a density on the order of from 13 to 17 grams per cubic centimeter, dynamically balancing the wheel body with respect to the axis of rotation thereof, and fixing abrasive means in the form of diamond grit in a matrix of bonding material to a surface of said body which is concentric with the axis of rotation thereof.

17. The method of making a grinding wheel which comprises; forming a disc-like grinding wheel body of a single mass of cemented tungsten carbide having a Young's modulus of elasticity of on the order of from 40 million to 90 million pounds per square inch and a density on the order of from 13 to 17 grams per cubic centimeter, dynamically balancing the wheel body with respect to the axis of rotation thereof, casting a ring of bonding material with diamond grit imbedded therein, and adhesively connecting the ring to an annular surface of said body which is concentric with the axis of rotation of the body.

18. The method according to claim 17 which includes the step of providing the face of the said ring toward the wheel body with a relatively thin layer of slightly resilient material.

References Cited by the Examiner
UNITED STATES PATENTS

| | | | |
|---|---|---|---|
| 1,991,233 | 2/1935 | Taylor | 51—206 |
| 1,996,598 | 4/1935 | Taylor. | |
| 3,196,585 | 7/1965 | Christensen et al. | 51—206 |

ROBERT C. RIORDON, *Primary Examiner.*

LESTER M. SWINGLE, *Examiner.*

L. S. SELMAN, *Assistant Examiner.*